US012697608B2

(12) United States Patent
Leflaive et al.

(10) Patent No.: US 12,697,608 B2
(45) Date of Patent: Aug. 4, 2026

(54) METHOD FOR THE SELECTIVE HYDROGENATION OF A GASOLINE IN THE PRESENCE OF A CATALYST ON A MESOPOROUS-MACROPOROUS SUBSTRATE

(71) Applicant: IFP Energies nouvelles, Rueil-Malmaison (FR)

(72) Inventors: Philibert Leflaive, Rueil-Malmaison Cedex (FR); Etienne Girard, Rueil-Malmaison Cedex (FR); Antoine Fecant, Rueil-Malmaison Cedex (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 613 days.

(21) Appl. No.: 18/036,772

(22) PCT Filed: Nov. 18, 2021

(86) PCT No.: PCT/EP2021/082067
§ 371 (c)(1),
(2) Date: May 12, 2023

(87) PCT Pub. No.: WO2022/112079
PCT Pub. Date: Jun. 2, 2022

(65) Prior Publication Data

US 2023/0405573 A1 Dec. 21, 2023

(30) Foreign Application Priority Data

Nov. 27, 2020 (FR) ....................................... 2012318

(51) Int. Cl.

*B01J 35/64* (2024.01)
*B01J 6/00* (2006.01)
*B01J 23/883* (2006.01)
*B01J 35/61* (2024.01)
*B01J 35/63* (2024.01)
*B01J 37/02* (2006.01)
*B01J 37/08* (2006.01)
*C10G 45/60* (2006.01)

(52) U.S. Cl.

CPC ............. *B01J 35/653* (2024.01); *B01J 6/001* (2013.01); *B01J 23/883* (2013.01); *B01J 35/613* (2024.01); *B01J 35/615* (2024.01); *B01J 35/635* (2024.01); *B01J 35/638* (2024.01); *B01J 35/647* (2024.01); *B01J 35/651* (2024.01); *B01J 37/0201* (2013.01); *B01J 37/08* (2013.01); *C10G 45/60* (2013.01); *C10G 2300/1037* (2013.01); *C10G 2400/02* (2013.01)

(58) Field of Classification Search
None
See application file for complete search history.

(56) References Cited

U.S. PATENT DOCUMENTS

| | | | | |
|---|---|---|---|---|
| 5,266,300 | A | 11/1993 | Harrison | |
| 5,397,756 | A | 3/1995 | Dufresne et al. | |
| 5,958,816 | A | 9/1999 | Neuman et al. | |
| 6,059,956 | A | 5/2000 | Dufresne | |
| 6,589,908 | B1 | 7/2003 | Ginestra et al. | |
| 6,896,795 | B2 | 5/2005 | Didillon et al. | |
| 7,718,053 | B2 | 5/2010 | Bouchy et al. | |
| 7,736,492 | B2 | 6/2010 | Bouchy et al. | |
| 7,790,130 | B2 | 9/2010 | Kanazirev | |
| 7,807,044 | B2 | 10/2010 | Roy-Auberger et al. | |
| 7,981,828 | B2 * | 7/2011 | Devers | B01J 27/19 208/217 |

FOREIGN PATENT DOCUMENTS

| | | | |
|---|---|---|---|
| CA | 2615225 | A1 | 6/2008 |
| CN | 109884122 | A | 6/2019 |

OTHER PUBLICATIONS

International Search Report PCT/EP2021/082067 dated Jan. 20, 2022 (pp. 1-2).

* cited by examiner

*Primary Examiner* — Keling Zhang
(74) *Attorney, Agent, or Firm* — Csaba Henter; MILLEN, WHITE, ZELANO & BRANIGAN

(57) ABSTRACT

A method for selective hydrogenation of gasoline including polyunsaturated compounds and light sulfur compounds wherein the gasoline and hydrogen is brought into contact with a catalyst containing a group VIB metal, a group VIII metal and a mesoporous and macroporous alumina substrate having a bimodal mesopore distribution and wherein the volume of mesopores having a diameter greater than or equal to 2 nm and less than 18 nm is 10 to 30% by volume of the total pore volume of the substrate, the volume of mesopores having a diameter greater than or equal to 18 nm and less than 50 nm is 30 to 50% by volume of the total pore volume of the substrate; the volume of macropores having a diameter greater than or equal to 50 nm and less than 8000 nm is 30 to 50% by volume of the total pore volume of the substrate.

20 Claims, No Drawings

METHOD FOR THE SELECTIVE HYDROGENATION OF A GASOLINE IN THE PRESENCE OF A CATALYST ON A MESOPOROUS-MACROPOROUS SUBSTRATE

TECHNICAL FIELD

The present invention relates to the field of hydrotreating gasoline cuts, notably gasoline cuts resulting from fluidized-bed catalytic cracking units. More particularly, the present invention relates to the use of a catalyst in a process for the selective hydrogenation of a gasoline and for increasing the molecular weight of light mercaptans, and to a process for jointly carrying out the selective hydrogenation of polyunsaturated compounds into monounsaturated compounds contained in gasolines, and also increasing the molecular weight of light sulfur compounds by reaction with unsaturated compounds.

PRIOR ART

The production of gasolines meeting the new environmental standards requires their sulfur content to be significantly reduced to values generally not exceeding 50 ppm, and preferentially less than 10 ppm.

It is furthermore known that conversion gasolines, and more particularly those originating from catalytic cracking, which can represent from 30% to 50% of the gasoline pool, have high contents of olefins and of sulfur.

The sulfur present in gasolines is for this reason attributable, to close to 90%, to the gasolines resulting from catalytic cracking processes, which will subsequently be called FCC (Fluid Catalytic Cracking) gasoline. FCC gasolines thus constitute the preferred feedstock for the process of the present invention. More generally, the process according to the invention is applicable to any gasoline cut containing a certain proportion of diolefins, and which may also contain some lighter compounds belonging to the C3 and C4 cuts.

The gasolines from cracking units are generally rich in olefins and sulfur, but also in diolefins, the content of which, for gasolines from catalytic cracking, can range up to 5% by weight.

Diolefins are unstable compounds which can easily polymerize and must generally be removed before any treatment of these gasolines, such as hydrodesulfurization treatments intended to meet the specifications on the sulfur content in gasolines. However, this hydrogenation must be selective with respect to the diolefins and must limit the hydrogenation of olefins in order to limit the hydrogen consumption and also the loss of octane from the gasoline. Furthermore, as has been described in patent application EP01077247 A1, it is advantageous to convert the mercaptans by increasing the molecular weight before the desulfurization step because this makes it possible to produce a desulfurized gasoline fraction composed mainly of olefins with 5 carbon atoms without loss of octane, by simple distillation. The amount of sulfur present in the feedstock after the selective hydrogenation and the increasing of the molecular weight of the light sulfur compounds is not modified; only the nature of the sulfur is modified by the increasing of the molecular weight of the light sulfur compounds.

In addition, the diene compounds present in the feedstock to be treated are unstable and have a tendency to form gums by polymerization. This gum formation leads to gradual deactivation of the this catalyst located downstream or gradual clogging of the hydrodesulfurization reactor. For an industrial application, it is therefore important to use catalysts which limit the formation of polymers, i.e. catalysts with low acidity or the porosity of which is optimized to facilitate the continuous extraction of the polymers or precursors of gums by the hydrocarbons in the feedstock, in order to ensure maximum cycle time for the catalyst.

It is known from the prior art that the pore distribution of the catalyst supports can have a beneficial impact on catalytic performance.

Document U.S. Pat. No. 6,589,908 discloses a process for preparing a catalyst support, which does not contain macroporosity and has a bimodal pore structure in the mesoporosity such that the two modes of porosity are separated by 1 to 20 nm. The support can be used in numerous catalytic applications, and in particular in hydrotreating, in particular in hydrodenitrogenation.

Document U.S. Pat. No. 5,266,300 discloses a method for preparing a porous alumina support for the use thereof as a hydrodesulfurization or hydrodemetallization catalyst support, said support comprising a total pore volume of between from 0.65 to 1.30 $cm^3/g$, said porous support comprising two populations of macropores, of which approximately 2% to 20% by volume, relative to the total pore volume, are in the form of macropores having a diameter of between 10 000 angströms and 100 000 angströms (1000 and 10 000 nm), approximately 5% to 30% by volume, relative to the total pore volume, are in the form of macropores having a diameter between 1000 angströms and 10 000 angströms (100 and 1000 nm), and approximately 50% to 93% by volume, relative to the total pore volume, are in the form of mesopores having a pore diameter of between 30 angströms and 1000 angströms (3-100 nm).

Documents CN108855197, CN104248987 and CN104248985 disclose catalysts for various catalytic applications (propane dehydrogenation, esterification), the support of which has a trimodal pore distribution, the mesopore populations being centered on three peaks respectively between 2 and 4 nm, 5 and 15 nm and 10 and 40 nm.

Document U.S. Pat. No. 7,790,130 discloses an alumina for halide scavenging comprising a trimodal porosity of which 40% to 49% by volume, relative to the total pore volume of the support, is in the form of pores having a diameter of between 15 and 50 nm.

Lastly, documents FR 2,895,414 and FR 2,895,415 disclose a process for the selective hydrogenation of polyunsaturated compounds by a catalyst having a macroporosity, the volume of which is between 10% and 40% of the total pore volume.

However, none of the prior art documents describes the use of a process for the selective hydrogenation of a gasoline comprising polyunsaturated compounds and light sulfur compounds in the presence of a catalyst comprising a support having both a bimodal mesoporous porosity, with a high mesopore volume coupled with a specific macropore volume.

In this context, one of the objectives of the present invention is to provide a process for jointly carrying out the selective hydrogenation of polyunsaturated compounds and more particularly diolefins, and also increasing the molecular weight of light sulfur compounds and more particularly mercaptans, in the presence of a supported catalyst having a performance in terms of activity and selectivity, at least as good, or even better, than the processes known from the prior art.

The applicant has discovered that the use of a catalyst based on at least one group VIB metal and at least one group VIII metal, on a mesoporous and macroporous support, having both a bimodal mesoporous porosity, with a high mesopore volume coupled with a given macropore volume has a better activity and a selectivity that is at least as good, or even better, in the hydrogenation of diolefins while allowing better conversion of light sulfur compounds compared to the catalysts disclosed in the prior art.

Specifically, without being bound to any scientific theory, the use of such a catalyst in a process for the selective hydrogenation of gasoline improves the phenomena of internal diffusion of reactants and products by the presence of populations of different sizes of mesopores. In addition, the combined presence of macroporosity is particularly well advised when the feedstock to be treated contains a significant amount of reactive olefins (unsaturated compounds), notably diolefins, which is the case for gasolines, which can give rise to the formation of gums and thus block the porosity of the catalyst without the presence of macroporosity.

SUBJECTS OF THE INVENTION

One subject of the invention is a process for the selective hydrogenation of a gasoline comprising polyunsaturated compounds and light sulfur compounds, process wherein the gasoline and hydrogen are brought into contact with a catalyst, at a temperature between 80° C. and 220° C., with a liquid space velocity of between 1 $h^{-1}$ and 10 $h^{-1}$ and a pressure of between 0.5 and 5 MPa, and with a molar ratio between hydrogen and the diolefins to be hydrogenated of greater than 1 and less than 100 mol/mol, said catalyst comprising at least one group VIB metal, at least one group VIII metal, and a mesoporous and macroporous alumina support comprising a bimodal distribution of mesopores and wherein:

- the volume of mesopores with a diameter greater than or equal to 2 nm and less than 18 nm corresponds to between 10% and 30% by volume of the total pore volume of said support;
- the volume of mesopores with a diameter greater than or equal to 18 nm and less than 50 nm corresponds to between 30% and 50% by volume of the total pore volume of said support;
- the volume of macropores with a diameter greater than or equal to 50 nm and less than 8000 nm corresponds to between 30% and 50% by volume of the total pore volume of said support; According to one or more embodiments, said support comprises a specific surface area of between 50 and 210 $m^2/g$.

According to one or more embodiments, said support comprises a total pore volume of between 0.7 and 1.3 ml/g.

According to one or more embodiments, the volume of mesopores with a diameter greater than or equal to 2 nm and less than 18 nm corresponds to between 15% and 25% by volume of the total pore volume of said support.

According to one or more embodiments, the volume of mesopores with a diameter greater than or equal to 18 nm and less than 50 nm corresponds to between 35% and 45% by volume of the total pore volume of said support.

According to one or more embodiments, the volume of macropores with a diameter greater than or equal to 50 nm and less than 8000 nm corresponds to between 35% and 50% by volume of the total pore volume of said support.

According to one or more embodiments, the content of group VIB metal in said catalyst, expressed in oxide form, is between 1% and 30% by weight relative to the total weight of the catalyst.

According to one or more embodiments, wherein the content of group VIII metal in said catalyst, expressed in oxide form, is between 1% and 20% by weight relative to the total weight of the catalyst.

According to one or more embodiments, the molar ratio of the group VIII metal to the group VIB metal is between 0.3 and 3 mol/mol.

According to one or more embodiments, the group VIII metal is nickel.

According to one or more embodiments, the group VIB metal is molybdenum.

According to one or more embodiments, the pore distribution of the mesopores with a diameter greater than or equal to 2 nm and less than 18 nm is centered on a range of values of between 10.5 and 14.5 nm.

According to one or more embodiments, the pore distribution of the mesopores with a diameter greater than or equal to 18 nm and less than 50 nm is centered on a range of values of between 22 and 28 nm.

According to one or more embodiments, the gasoline is a catalytic cracking gasoline.

According to one or more embodiments, the support is in the form of beads with a diameter of between 2 and 4 mm.

According to one or more embodiments, when the support is in the form of beads, said support is obtained according to the following steps:

- s1) dehydrating an aluminum hydroxide or an aluminum oxyhydroxide at a temperature of between 400° C. and 1200° C., preferably between 600° C. and 900° C., for a time of between 0.1 second and 5 seconds, preferably between 0.1 second and 4 seconds, to obtain an alumina powder;
- s2) shaping said alumina powder obtained in step s1) in the form of beads;
- s3) heat treating the alumina beads obtained in step s2) at a temperature above or equal to 200° C.;
- s4) hydrothermally treating the alumina beads obtained at the end of step s3) by impregnation with water or an aqueous solution, then residence in an autoclave at a temperature of between 100° C. and 300° C.;
- s5) calcining the alumina beads obtained at the end of step s4) at a temperature of between 500° C. and 820° C.

According to one or more embodiments, said catalyst does not comprise phosphorus.

DETAILED DESCRIPTION OF THE INVENTION

1. Definitions

In the text hereinbelow, the groups of chemical elements are given according to the CAS classification (CRC Handbook of Chemistry and Physics, published by CRC Press, editor-in-chief D. R. Lide, 81st edition, 2000-2001). For example, group VIII according to the CAS classification corresponds to the metals of columns 8, 9 and 10 according to the new IUPAC classification.

The BET specific surface area is measured by nitrogen physisorption according to the standard ASTM D3663-03, a method described in the work by Rouquerol F., Rouquerol J. and Singh K., "*Adsorption by Powders & Porous Solids: Principles, Methodology and Applications*", Academic Press, 1999.

In the present description, according to the IUPAC convention, "micropores" are understood to mean the pores having a diameter of less than 2 nm, i.e. 0.002 μm; "mesopores" are understood to mean the pores having a diameter of greater than 2 nm, i.e. 0.002 μm, and less than 50 nm, i.e. 0.05 μm, and "macropores" are understood to mean the pores having a diameter of greater than or equal to 50 nm, i.e. 0.05 μm.

In the following description of the invention, the "total pore volume" of the alumina or of the catalyst is understood to mean the volume measured by mercury porosimetry according to the standard ASTM D4284-83 at a maximum pressure of 4000 bar (400 MPa), using a surface tension of 484 dyne/cm and a contact angle of 140°. The wetting angle was taken equal to 140° following the recommendations of the publication "Techniques de l'ingénieur, traité analyse et caractérisation" [Techniques of the Engineer, Analysis and Characterization Treatise], pages 1050-5, written by Jean Charpin and Bernard Rasneur.

In order to obtain better accuracy, the value of the total pore volume in ml/g that is given in the text which follows corresponds to the value of the total mercury volume (total pore volume measured by mercury intrusion porosimetry) in ml/g measured on the sample minus the value of the mercury volume in ml/g measured on the same sample for a pressure corresponding to 30 psi (approximately 0.2 MPa).

The volume of the macropores and of the mesopores is measured by mercury intrusion porosimetry according to the standard ASTM D4284-83 at a maximum pressure of 4000 bar (400 MPa), using a surface tension of 484 dyne/cm and a contact angle of 140°.

The value at and above which the mercury fills all the intergranular voids is set at 0.2 MPa and it is considered that, above this value, the mercury penetrates into the pores of the sample.

The macropore volume of the catalyst is defined as being the cumulative volume of mercury introduced at a pressure of between 0.2 MPa and 30 MPa, corresponding to the volume contained in the pores with an apparent diameter of greater than 50 nm.

The mesopore volume of the catalyst is defined as being the cumulative volume of mercury introduced at a pressure of between 30 MPa and 400 MPa, corresponding to the volume contained in the pores with an apparent diameter of between 2 and 50 nm.

When the incremental pore volume measured by mercury porosimetry is plotted as a function of the pore diameter, the porosity modes correspond to the inflection points of the function represented.

The contents of group VIII metal and group VIB metal are measured by X-ray fluorescence.

2. Description

Catalyst

The catalyst used in the context of the selective hydrogenation process according to the invention comprises an active phase formed from at least one group VIB metal and from at least one group VIII metal.

The group VIB metal present in the active phase of the catalyst is preferentially chosen from molybdenum and tungsten, more preferentially from molybdenum. The group VIII metal present in the active phase of the catalyst is preferentially chosen from cobalt, nickel and the mixture of these two elements, more preferentially from nickel.

Preferably, the active phase consists of molybdenum and nickel.

The total content of group VIII metal is generally between 1% and 20% by weight, expressed in the oxide form of the group VIII metal, relative to the total weight of the catalyst, preferably between 2% and 15% by weight, preferably between 3% and 13% by weight, relative to the total weight of the catalyst. When the metal is cobalt or nickel, the metal content is expressed as CoO or NiO respectively.

The content of group VIB metal is generally between 1% and 30% by weight, expressed in the oxide form of the group VIB metal, relative to the total weight of the catalyst, preferably between 5% and 20% by weight, and even more preferentially between 8% and 15% by weight relative to the total weight of the catalyst. When the metal is molybdenum or tungsten, the metal content is expressed as $MoO_3$ or $WO_3$ respectively.

The molar ratio between the group VIII metal and the group VIB metal is advantageously between 0.3 and 3 mol/mol, preferably between 0.4 and 2.5 mol/mol, and very preferably between 0.5 and 2 mol/mol.

The group VIII metal is preferably nickel.

The group VIB metal is preferably molybdenum.

Preferably, the catalyst does not contain phosphorus.

The catalyst generally comprises a specific surface area of between 50 and 200 $m^2/g$, preferably between 60 and 170 $m^2/g$ and preferably between 70 and 130 $m^2/g$.

The pore volume of the catalyst is generally between 0.5 ml/g and 1.3 ml/g, and preferably between 0.6 ml/g and 1.1 ml/g.

Alumina Support

The alumina support of the catalyst used in the context of the selective hydrogenation process according to the invention is a macroporous and mesoporous alumina support comprising a bimodal distribution of mesopores, wherein:

- the volume of mesopores with a diameter greater than or equal to 2 nm and less than 18 nm corresponds to between 10% and 30% by volume of the total pore volume of said support;
- the volume of mesopores with a diameter greater than or equal to 18 nm and less than 50 nm corresponds to between 30% and 50% by volume of the total pore volume of said support;
- the volume of macropores with a diameter greater than or equal to 50 nm and less than 8000 nm corresponds to between 30% and 50% by volume of the total pore volume of said support;

Preferably, the volume of the mesopores of the support with a diameter greater than or equal to 2 nm and less than 18 nm corresponds to between 15% and 25% by volume of the total pore volume of said support.

Preferably, the volume of the mesopores of the support with a diameter greater than or equal to 18 nm and less than 50 nm corresponds to between 35% and 45% by volume of the total pore volume of said support.

Preferably, the volume of the macropores of the support with a diameter greater than or equal to 50 nm and less than 8000 nm corresponds to between 35% and 50% by volume of the total pore volume of said support.

In one embodiment according to the invention, the pore distribution of the mesopores with a diameter greater than or equal to 2 nm and less than 18 nm is centered on a range of values of between 10.5 and 14.5 nm, preferably between 12 and 13 nm.

In one embodiment according to the invention, the pore distribution of the mesopores with a diameter greater than or equal to 18 nm and less than 50 nm is centered on a range of values of between 22 and 28 nm, preferably between 23 and 27 nm.

The support generally comprises a specific surface area of between 50 and 210 $m^2/g$, preferably between 70 and 180 $m^2/g$ and preferably between 70 and 160 $m^2/g$.

The pore volume of the support is generally between 0.7 ml/g and 1.3 ml/g, and preferably between 0.8 ml/g and 1.2 ml/g.

Advantageously, the support is in the form of beads with a diameter of between 0.8 and 10 mm, preferentially between 1 and 5 mm, and more preferentially between 2 and 4 mm.

Preferably, the catalyst consists of an active phase consisting of molybdenum and nickel and of the mesoporous and macroporous alumina support comprising a bimodal distribution of mesopores and wherein:

- the volume of mesopores with a diameter greater than or equal to 2 nm and less than 18 nm corresponds to between 10% and 30% by volume of the total pore volume of said support;
- the volume of mesopores with a diameter greater than or equal to 18 nm and less than 50 nm corresponds to between 30% and 50% by volume of the total pore volume of said support;
- the volume of macropores with a diameter greater than or equal to 50 nm and less than 8000 nm corresponds to between 30% and 50% by volume of the total pore volume of said support;

Process for Preparing the Support

The alumina support of the catalyst used in the context of the selective hydrogenation process according to the invention can be synthesized by any method known to those skilled in the art.

According to a preferred embodiment, the alumina support used according to the invention is in the form of beads. According to this preferred embodiment, the preparation of the support comprises the following steps:

- s1) dehydrating an aluminum hydroxide or an aluminum oxyhydroxide at a temperature of between 400° C. and 1200° C., preferably between 600° C. and 900° C., for a time of between 0.1 second and 5 seconds, preferably between 0.1 second and 4 seconds, to obtain an alumina powder;
- s2) shaping said alumina powder obtained in step s1) in the form of beads;
- s3) heat treating the beads obtained in step s2) at a temperature above or equal to 200° C.;
- s4) hydrothermally treating the alumina beads obtained at the end of step s3) by impregnation with water or an aqueous solution, preferentially an acidic aqueous solution, then residence in an autoclave at a temperature of between 100° C. and 300° C., preferably between 150° C. and 250° C.;
- s5) calcining said alumina beads obtained at the end of step s4) at a temperature of between 500° C. and 820° C.

Steps s1) to s5) are described in detail below.

Step s1

According to step s1), an aluminum hydroxide or an aluminum oxyhydroxide is dehydrated at a temperature of between 400° C. and 1200° C., preferably between 600° C. and 900° C., for a time of between 0.1 second and 5 seconds, preferably between 0.1 second and 4 seconds, to obtain an alumina powder. The aluminum hydroxide can be chosen from hydrargillite, gibbsite or bayerite. The aluminum oxyhydroxide can be chosen from boehmite or diaspore.

Preferably, step s1) is carried out by using hydrargillite.

Generally, step s1) is carried out in the presence of a stream of hot gas, such as dry air or moist air, making it possible to quickly remove and entrain the evaporated water.

Generally, the active alumina powder obtained after the dehydration of the aluminum hydroxide or oxyhydroxide is ground to a particle size of between from 10 to 200 μm.

Generally, the active alumina powder obtained after the dehydration of the aluminum hydroxide or oxyhydroxide is washed with water or an acidic aqueous solution. When the washing step is carried out with an acidic aqueous solution, any mineral or organic acid can be used, preferably nitric acid, hydrochloric acid, perchloric acid or sulfuric acid for the mineral acids, and a carboxylic acid (formic, acetic or malonic acid), a sulfonic acid (para-toluenesulfonic acid) or a sulfuric ester (lauryl sulfate) for the organic acids.

Step s2

According to step s2), said alumina powder obtained at the end of step s1) is shaped.

The shaping of said alumina powder is carried out so as to obtain beads, which is referred to as granulation, and is generally carried out by means of a rotating technology, such as a rotating granulator or a rotating drum. This type of process makes it possible to obtain beads with a diameter and with pore distributions which are controlled, these dimensions and these distributions generally being created during the agglomeration step.

The porosity can be created by various means, such as the choice of the particle size distribution of the alumina powder or the agglomeration of several alumina powders with different particle size distributions. Another method consists in mixing, with the alumina powder, before or during the agglomeration step, one or more compounds, known as pore-forming compounds, which disappear by heating and which thus create a porosity in the beads. As pore-forming compounds used, mention may be made, by way of example, of wood flour, charcoal, activated carbon, carbon black, sulfur, tars, plastics or emulsions of plastics, such as polyvinyl chloride, polyvinyl alcohols, naphthalene or the like. The amount of pore-forming compounds added is determined by the volume desired to obtain beads with a green filling density of between 500 and 1100 $kg/m^3$, preferentially between 700 and 950 $kg/m^3$, and with a diameter of between 0.8 and 10 mm, preferentially between 1 and 5 mm, and even more preferentially between 2 and 4 mm. The beads obtained can be selected by screening according to the desired particle size.

Step s3

According to step s3), a heat treatment of the alumina powder shaped in the form of beads obtained on conclusion of step s2) is carried out at a temperature above or equal to 200° C., preferably of between 200° C. and 1200° C., preferentially between 300° C. and 900° C., very preferentially between 400° C. and 750° C., for a period of time of generally between 1 and 24 hours, preferably between 1 and 6 hours. The beads obtained in this intermediate step comprise a specific surface area of between 50 and 420 $m^2/g$, preferably between 60 and 350 $m^2/g$, and even more preferentially between 80 and 300 $m^2/g$.

Step s4

According to step s4), the alumina beads obtained on conclusion of step s3) are subjected to a hydrothermal treatment by impregnation with water or an aqueous solution, preferentially an acidic aqueous solution, then residence in an autoclave at a temperature of between 100° C. and 300° C., preferably between 150° C. and 250° C.

The hydrothermal treatment is generally carried out at a temperature of from 100° C. to 300° C., preferentially from 150° C. to 250° C., for a period of time of greater than 45 minutes, preferentially from 1 to 24 hours, very preferentially from 1.5 to 12 hours. The hydrothermal treatment is generally carried out using an acidic aqueous solution comprising one or more mineral and/or organic acids, preferably nitric acid, hydrochloric acid, perchloric acid, sulfuric acid or weak acids, the solution of which has a pH of less than 4, such as acetic acid or formic acid. Generally, said acidic aqueous solution also comprises one or more compounds capable of releasing anions capable of combining with aluminum ions, preferably compounds comprising a nitrate ion (such as aluminum nitrate), chloride, sulfate, perchlorate, chloroacetate, trichloroacetate, bromoacetate or dibromoacetate ion, and the anions of general formula: $R—COO^-$, such as formates and acetates.

Step s5

According to step s5), the alumina beads obtained on conclusion of step s4) are calcined at a temperature of between 500° C. and 820° C., preferentially between 550° C. and 750° C., and for a period of time of generally between 1 and 24 hours, preferably between 1 and 6 hours. On conclusion of this step, the alumina beads obtained comprise a specific surface area of between 50 and 210 $m^2/g$, preferably between 70 and 180 $m^2/g$ and even more preferentially between 70 and 160 $m^2/g$.

Process for Preparing the Catalyst

The catalyst used in the context of the selective hydrogenation process according to the invention can be prepared by means of any technique known to those skilled in the art, and notably by impregnation of the group VIII and VIB elements on the selected support.

This impregnation can, for example, be carried out according to the method known to those skilled in the art under the terminology of dry impregnation, wherein just the amount of desired elements in the form of soluble salts is introduced into the chosen solvent, for example demineralized water, so as to fill as exactly as possible the porosity of the support. The precursor of the active phase based on the group VIII element and the precursor of the active phase of the group VIB element can be introduced simultaneously or successively. The impregnation of each precursor can advantageously be carried out at least twice. The various precursors can thus advantageously be impregnated successively with a different impregnation and maturation time. One of the precursors can also be impregnated several times. The support thus filled with the solution is left to mature at a temperature below 50° C., preferably at ambient temperature, for a period of between 0.5 hour and 12 hours, preferably between 0.5 hour and 6 hours, and even more preferentially between 0.5 and 3 hours.

After introducing the precursors of the active phase, the catalyst precursor is subjected to an activation treatment. The aim of this treatment is generally to transform the molecular precursors of the elements into the oxide phase. It is in this case an oxidizing treatment but a simple drying of the catalyst can also be carried out.

In the case of drying, the catalyst precursor is dried at a temperature of between 50° C. and 200° C., preferably between 70° C. and 180° C., for a period typically of between 0.5 and 12 hours, and even more preferably for a period from 0.5 to 5 hours. The drying step is advantageously carried out in a traversed bed using hot air or any other hot gas. Preferably, when the drying is carried out in a traversed bed, the gas used is either air or an inert gas, such as argon or nitrogen. Very preferably, the drying is carried out in a traversed bed in the presence of air.

In the case of an oxidizing treatment, also referred to as calcination, said treatment is generally carried out under air or under dilute oxygen, and the treatment temperature is generally between 200° C. and 550° C., preferably between 300° C. and 500° C., and advantageously for a period typically of between 0.5 and 24 hours, preferably for a period from 0.5 to 12 hours, and even more preferably for a period from 0.5 to 10 hours. The oxidizing treatment step is advantageously carried out in a traversed bed using air or any other hot gas. Preferably, when the oxidizing treatment is carried out in a traversed bed, the gas used is either air or an inert gas, such as argon or nitrogen. Very preferably, the oxidizing treatment is carried out in a traversed bed in the presence of air.

By way of example, when the group VIII element is nickel and the group VIB element is molybdenum, molybdenum and nickel metal salts that can be used in the catalyst preparation process are, for example, nickel nitrate and ammonium heptamolybdate. Any other salt known to those skilled in the art which has a sufficient solubility and can be decomposed during the activation treatment can also be used. Advantageously, the drying and the oxidizing treatment are both carried out during the catalyst preparation process.

Before its use as hydrotreating catalyst, it is advantageous to subject the dried or optionally calcined catalyst to a sulfidation step (activation phase). This activation phase is carried out by methods well known to those skilled in the art, and advantageously under a sulfo-reductive atmosphere in the presence of hydrogen and hydrogen sulfide. The hydrogen sulfide can be used directly or generated by a sulfide agent (such as dimethyl disulfide).

The catalyst is preferably used at least partly in its sulfided form. The introduction of the sulfur can take place before or after any activation step, that is to say drying or calcining step. The sulfur or a sulfur compound can be introduced ex situ, that is to say outside the reactor where the process according to the invention is carried out, or in situ, that is to say in the reactor used for the process according to the invention. In the first case, these ex situ sulfidations are characterized by a final passivation step. Indeed, the sulfide phases have a very high reactivity with respect to ambient air (self-heating nature due to oxidation) prohibiting their subsequent handling without additional treatment aimed at limiting this reactivity. Among the commercial ex situ sulfidation procedures, mention is made of the TOTSUCAT™ process from Eurecat (EP 0 564 317 B1 and EP 0 707 890 B1) and the XpresS™ process from Tricat (U.S. Pat. No. 5,958,816). In the second case (in situ sulfidation), the catalyst is sulfided by passing a feedstock containing at least one sulfur compound, which, once decomposed, leads to fixing of sulfur on the catalyst. This feedstock may be gaseous or liquid, for example hydrogen containing $H_2S$, or a liquid containing at least one sulfur compound.

Selective Hydrogenation Process

The invention relates to a process for treating a gasoline comprising any type of chemical family and notably diolefins, mono-olefins, and sulfur compounds in the form of mercaptans and light sulfides. The present invention finds particular application in the transformation of conversion gasolines, and in particular gasolines originating from catalytic cracking, from fluid catalytic cracking (FCC), from a coking process, from a visbreaking process, or from a pyrolysis process. Preferably, the feedstock is a gasoline from catalytic cracking units. The feedstocks to which the invention applies generally have a boiling point of between 0° C. and 280° C. The feedstocks can also contain hydrocarbons with 3 or 4 carbon atoms.

For example, the gasolines resulting from catalytic cracking (FCC) units contain, on average, between 0.5% and 5% by weight of diolefins, between 20% and 50% by weight of mono-olefins and between 10 ppm and 0.5% by weight of sulfur, generally including less than 300 ppm of mercaptans. The mercaptans are generally concentrated in the light fractions of the gasoline and more specifically in the fraction having a boiling point of below 120° C.

The gasoline treatment described in the present selective hydrogenation process mainly consists in:

- selectively hydrogenating the diolefins to mono-olefins;
- transforming the saturated light sulfur compounds and mainly mercaptans into heavier sulfides or mercaptans by reaction with the mono-olefins;
- isomerizing the mono-olefin compounds having their C═C double bond in the external position into their isomer having their C═C double bond in the internal position.

The reactions for hydrogenation of diolefins into mono-olefins are illustrated below by the transformation of 1,3-pentadiene, an unstable compound, which can easily be hydrogenated into 2-pentene. However, it is sought to limit the side reactions of mono-olefin hydrogenation which, in the example below, would lead to the formation of n-pentane.

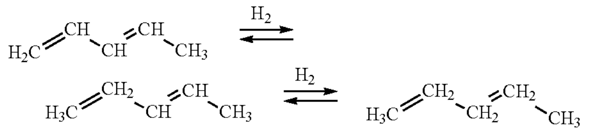

The sulfur compounds which it is sought to transform are mainly mercaptans. The main reaction to transform mercaptans consists of a thioetherification reaction between the mono-olefins and the mercaptans. This reaction is illustrated below by the addition of propane-2-thiol to 2-pentene to form a propylpentyl sulfide.

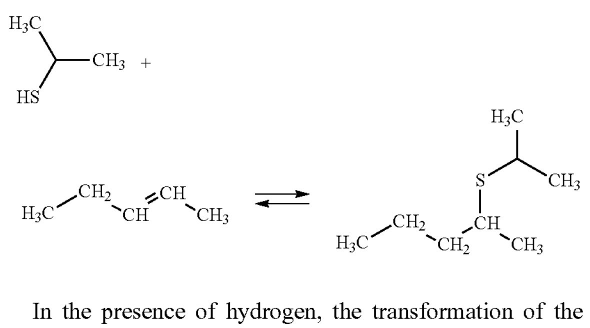

In the presence of hydrogen, the transformation of the sulfur compounds can also go through the intermediate formation of $H_2S$ which can then be added to the unsaturated compounds present in the feedstock. However, this route is in the minority under the preferred reaction conditions.

In addition to mercaptans, the compounds likely to be transformed and made heavier in this way are sulfides and mainly $CS_2$, COS, thiophane and methylthiophane.

In some cases, it is possible to observe reactions in which the molecular weight of light nitrogenous compounds, and mainly nitriles, pyrrole and its derivatives, is increased.

According to the invention, the catalyst also makes it possible to carry out an isomerization of the mono-olefinic compounds having their C═C double bond in the external position into their isomer having their C═C double bond in the internal position.

This reaction is illustrated below by the isomerization of 1-hexene to 2-hexene or 3-hexene.

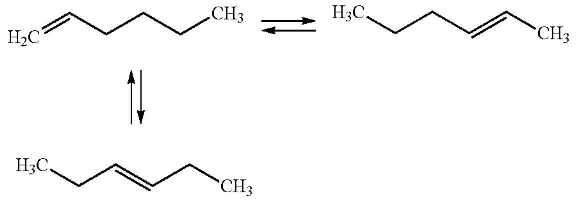

In the selective hydrogenation process according to the invention, the feedstock to be treated is mixed with hydrogen before being brought into contact with the catalyst. The amount of hydrogen injected is such that the molar ratio between the hydrogen and the diolefins to be hydrogenated is greater than 1 (stoichiometry) and less than 100, and preferably between 1 and 10 mol/mol. Too much excess hydrogen can lead to strong hydrogenation of mono-olefins and consequently a decrease in the octane number of the gasoline. All of the feedstock is generally injected at the inlet of the reactor. However, it may be advantageous, in certain cases, to inject a fraction or all of the feedstock between two consecutive catalytic beds placed in the reactor. This embodiment makes it possible notably to continue to operate the reactor if the inlet of the reactor is clogged by deposits of polymers, particles, or gums present in the feedstock.

The mixture consisting of gasoline and hydrogen is brought into contact with the catalyst at a temperature of between 80° C. and 220° C., and preferably between 90° C. and 200° C., with a liquid hourly space velocity (LHSV) of between 1 $h^{-1}$ and 10 $h^{-1}$, the liquid hourly space velocity being the liter of feedstock per liter of catalyst and per hour (l/l·h). The pressure is adjusted so that the reaction mixture is mainly in liquid form in the reactor. The pressure is between 0.5 MPa and 5 MPa and preferably between 1 and 4 MPa.

The gasoline treated under the conditions stated above has a reduced content of diolefins and mercaptans. Generally, the gasoline produced contains less than 1% by weight of diolefins, and preferably less than 0.5% by weight of diolefins. The light sulfur compounds having a boiling point lower than that of thiophene (84° C.) are generally more than 50% converted. It is therefore possible to separate the light fraction from the gasoline by distillation and to send this fraction directly to the gasoline pool without additional hydrodesulfurization treatment. The light fraction of gasoline generally has a final point below 120° C., and preferably below 100° C. and most preferably below 80° C.

The selective hydrogenation process according to the invention is particularly suitable for being implemented in the context of the desulfurization process described in patent application EP 1 077 247.

A subject of the present invention is also a process for the desulfurization of gasoline comprising sulfur compounds, comprising at least the following steps:

a) a selective hydrogenation step implementing the process described above;

b) a step of separating the gasoline obtained in step a) into two fractions respectively comprising a light gasoline and a heavy gasoline;

c) a step of hydrodesulfurization of the heavy gasoline separated in step b) over a catalyst making it possible to at least partially decompose the sulfur compounds into $H_2S$.

The separation step b) is preferably carried out by means of a conventional distillation column, also called a splitter. This fractionating column must make it possible to separate a light fraction of the gasoline containing less than 10 ppm by weight of sulfur.

This column generally operates at a pressure of between 0.1 and 2 MPa, preferably between 0.2 and 1 MPa. The number of theoretical plates of this separation column is generally between 10 and 100 and preferably between 20 and 60. The reflux ratio, expressed as being the ratio of the liquid flow rate in the column divided by the distillate flow rate expressed in kg/h, is generally less than 1 and preferably less than 0.8.

The light gasoline obtained on conclusion of the separation generally contains at least all of the C5 olefins, preferably the C5 compounds and at least 20% of the C6 olefins. Generally, this light fraction has a sulfur content of less than 10 ppm by weight of sulfur, that is to say that it is not necessary to treat the light cut by an additional hydrodesulfurization step before using it as fuel.

The desulfurization step c) is preferably a hydrodesulfurization step carried out by passing heavy gasoline, in the presence of hydrogen, over a catalyst comprising at least one group VIII element and/or at least one group VIB element at least partly in sulfide form, at a temperature of between about 210° C. and about 350° C., preferably between 220° C. and 320° C., under a pressure generally of between about 1 and about 4 MPa, preferably between 1.5 and 3 MPa.

The liquid hourly space velocity is between about 1 and about 20 $h^{-1}$ (expressed as volume of liquid per volume of catalyst and per hour), preferably between 1 and 10 $h^{-1}$, very preferably between 3 and 8 $h^{-1}$. The $H_2$/feedstock ratio is between 100 and 600 Nl/l and preferentially between 300 and 600 Nl/l.

The content of group VIII metal, expressed as oxide, is generally between 0.5% and 15% by weight and preferentially between 1% and 10% by weight, relative to the weight of the catalyst. The content of group VIB metal, expressed as oxide, is generally between 1.5% and 60% by weight and preferentially between 3% and 50% by weight, relative to the weight of catalyst.

The group VIII element, when present, is preferably cobalt, and the group VIB element, when present, is generally molybdenum or tungsten. Combinations such as cobalt-molybdenum are preferred. The support of the catalyst is usually a porous solid such as, for example, an alumina, a silica-alumina, or other porous solids such as, for example, magnesia, silica or titanium oxide, alone or as a mixture with alumina or silica-alumina. To minimize the hydrogenation of the olefins present in the heavy gasoline, it is advantageous to preferentially use a catalyst wherein the density of group VIB metal, expressed as % by weight of group VIB metal in oxide form (the % by weight being expressed relative to the total weight of the catalyst) per unit of specific surface area, is greater than 0.07 and preferably greater than 0.12. The catalyst according to step c) preferably has a specific surface area of less than 250 $m^2/g$, more preferably less than 230 $m^2/g$, and very preferably less than 190 $m^2/g$.

The deposition of the metals on the support is obtained by any method known to those skilled in the art, such as, for example, dry impregnation, by excess of a solution containing the metal precursors. The impregnation solution is chosen so as to be able to dissolve the metal precursors in the desired concentrations. For example, in the case of the synthesis of a CoMo catalyst, the molybdenum precursor can be molybdenum oxide, ammonium heptamolybdate, while the cobalt precursor can be for example cobalt nitrate, cobalt hydroxide, cobalt carbonate. The precursors are generally dissolved in a medium allowing their solubilization in the desired concentrations.

After introduction of the element(s) and optionally shaping of the catalyst, the catalyst is activated in a first step. This activation can correspond either to oxidation and then to reduction, or to direct reduction, or to calcining only. The calcining step is generally carried out at temperatures ranging from about 100° C. to about 600° C. and preferably of between 200° C. and 450° C., under a flow of air. The reduction step is carried out under conditions making it possible to convert at least a part of the oxidized forms of the base metal into metal. Generally, it consists in treating the catalyst under a stream of hydrogen at a temperature preferably at least equal to 300° C. The reduction can also be partly carried out by means of chemical reducing agents.

The catalyst used in step c) is preferably used at least partly in its sulfided form. The introduction of the sulfur can take place before or after any activation step, that is to say calcining or reduction step. The sulfur or a sulfur compound can be introduced ex situ, that is to say outside the hydrodesulfurization reactor, or in situ, that is to say in the hydrodesulfurization reactor. In the first case, these ex situsulfidations are characterized by a final passivation step. Indeed, the sulfide phases have a very high reactivity with respect to ambient air (self-heating nature due to oxidation) prohibiting their subsequent handling without additional treatment aimed at limiting this reactivity. Among the commercial ex situsulfidation procedures, mention is made of the TOTSUCAT™ process from Eurecat (EP 0 564 317 B1 and EP 0 707 890 B1) and the XpresS™ process from Tricat (U.S. Pat. No. 5,958,816). In the second case (in situ sulfidation), the catalyst is preferably reduced under the conditions described above, then sulfided by passing a feedstock containing at least one sulfur compound, which, once decomposed, leads to fixing of sulfur on the catalyst. This feedstock may be gaseous or liquid, for example hydrogen containing $H_2S$, or a liquid containing at least one sulfur compound.

EXAMPLES

Example 1: Catalyst A (According to the Invention)

The support S1 of the catalyst A is obtained by dehydration of hydrargillite (Emplura®, Merck™) in order to obtain an alumina powder. The temperature is set at 800° C. and the contact time of the material to be dehydrated with a flow of dry air is 1 second. The alumina powder obtained is ground to a particle size of between from 10 to 200 μm and then washed three times with a volume of distilled water equal to twice the volume of the powder used. Said alumina powder is shaped in the presence of carbon black (N990 Thermax®) with a disk pelletizer (GRELBEX™ P30) equipped with a conical cylindrical pan at an angle of 300 and a rotation speed of 40 rpm so as to obtain beads with a diameter predominantly between 2 and 4 mm after screening the solid. The amount of carbon black is adjusted to obtain a green filling density of the objects of 800 $kg/m^3$. Said beads are subjected to a heat treatment in air at 720° C. so as to give them a specific surface area of 200 $m^2/g$. Next, a hydrothermal treatment is applied to said beads by impregnation of the pore volume with an aqueous solution of nitric acid (0.1N, Merck™). The hydrothermal treatment is carried out at a temperature of 200° C. for 6.5 hours, in a rotating basket autoclave. The beads thus obtained are subjected to a final calcination treatment in air at 650° C. for 2 hours. The support S1 has a specific surface area of 141 $m^2/g$, a total pore volume of 0.97 ml/g, and also the following pore distribution given by mercury porosimetry:

- a volume of mesopores with a diameter greater than or equal to 2 nm and less than 18 nm, the pore distribution of which is centered on 13 nm, of 0.15 ml/g corresponding to 15% of the total pore volume;
- a volume of mesopores with a diameter greater than or equal to 18 nm and less than 50 nm, the pore distribution of which is centered on 26 nm, of 0.43 ml/g corresponding to 44% of the total pore volume;
- a volume of macropores with a diameter greater than or equal to 50 nm and less than 8000 nm, of 0.39 ml/g corresponding to 40% of the total pore volume.

The support S1 has a water uptake volume of 0.95 ml/g. The impregnation solution is prepared by diluting 6.07 g of ammonium heptamolybdate ($Mo_7(NH_4)_6O_{24}·4H_2O$, 99.98%, Merck™) 17.43 g of nickel nitrate ($Ni(NO_3)_2·6H_2O$, 99.5%, Merck™) in 36.2 ml of distilled water. After dry impregnation of 40 g of support and a step of maturing for 12 hours in a moisture-saturated atmosphere, the solid is dried at 120° C. for 12 hours. The solid is subsequently calcined in air at 450° C. for 2 hours. Catalyst A obtained contains 9.1% by weight of NiO and 10.0% by weight of $MoO_3$, and also an Ni/Mo molar ratio=1.75. Catalyst A has a total pore volume of 0.83 ml/g and a specific surface area of 103 $m^2/g$.

Example 2: Catalyst B not in Accordance with the Invention (Macroporous and Mesoporous Catalyst with a Monomodal Distribution of Large Mesopores)

The support S2 of the catalyst B is obtained by dehydration of hydrargillite (Emplura®, Merck) in order to obtain an active alumina powder. The temperature is set at 800° C. and the contact time of the material to be dehydrated with a flow of dry air is 1 second. The active alumina powder obtained is ground to a particle size of between from 10 to 200 μm and then washed three times with a volume of distilled water equal to twice the volume of the powder used. Said active alumina powder is shaped with a disk pelletizer (GRELBEX™ P30) equipped with a conical cylindrical pan at an angle of 300 and a rotation speed of 40 rpm so as to obtain beads with a diameter predominantly between 2 and 4 mm (after screening the solid) and a green filling density of the objects of 780 $kg/m^3$. Said beads are subjected to a heat treatment in air at 700° C. so as to give them a specific surface area of 250 $m^2/g$. Next, a hydrothermal treatment is applied to said beads by impregnation of the pore volume with an aqueous solution of nitric acid (0.1 N, Merck™). The hydrothermal treatment is carried out at a temperature of 200° C. for 6.5 hours, in a rotating basket autoclave. The beads thus obtained are subjected to a final calcination treatment in air at 950° C. for 2 hours. The support S2 has a specific surface area of 71 $m^2/g$, a total pore volume of 0.56 ml/g, and also the following pore distribution given by mercury porosimetry:

- a volume of mesopores with a diameter greater than or equal to 10 nm and less than 50 nm, the pore distribution of which is centered on 20 nm, of 0.35 ml/g corresponding to 63% of the total pore volume;
- a volume of macropores with a diameter greater than or equal to 50 nm and less than 8000 nm, of 0.21 ml/g corresponding to 38% of the total pore volume.

The support S2 has a water uptake volume of 0.54 ml/g. The impregnation solution is prepared by diluting 2.76 g of ammonium heptamolybdate ($Mo_7(NH_4)_6O_{24}·4H_2O$, 99.98%, Merck™), 8.80 g of nickel nitrate ($Ni(NO_3)_2·6H_2O$, 99.5%, Merck™) in 20.7 ml of distilled water. After dry impregnation of 40 g of support and a step of maturing for 12 hours in a moisture-saturated atmosphere, the solid is dried at 120° C. for 12 hours. A second impregnation step is carried out with a solution prepared by diluting 3.18 g of ammonium heptamolybdate ($Mo_7(NH_4)_6O_{24}·4H_2O$, 99.98%, Merck™), 7.69 g of nickel nitrate ($Ni(NO_3)_2·6H_2O$, 99.5%, Merck™) in 18.8 ml of distilled water. After dry impregnation of 40 g of support and a step of maturing for 12 hours in a moisture-saturated atmosphere, the solid is dried at 120° C. for 12 hours. The solid is subsequently calcined in air at 450° C. for 2 hours. Catalyst B obtained contains 8.9% by weight of NiO and 10.3% by weight of $MoO_3$, and also an Ni/Mo molar ratio=1.67. The catalyst B has a total pore volume of 0.45 ml/g and a specific surface of 59 $m^2/g$.

Example 3: Catalyst C not in Accordance with the Invention (Macroporous Catalyst)

A commercial support S3 (SA52124, UniSpheres® NorPro) in the form of beads with a diameter of between 2 and 4 mm is provided. The support S3 has a specific surface of 8 $m^2/g$, a total pore volume of 0.33 ml/g, and also the following pore distribution given by mercury porosimetry:

- a volume of macropores with a diameter greater than or equal to 50 nm and less than 8000 nm, of 0.33 ml/g corresponding to 100% of the total pore volume.

The support S3 has a water uptake volume of 0.47 ml/g. The impregnation solution is prepared by diluting 2.76 g of ammonium heptamolybdate ($Mo_7(NH_4)_6O_{24}·4H_2O$, 99.98%, Merck™), 8.80 g of nickel nitrate ($Ni(NO_3)_2·6H_2O$, 99.5%, Merck™) in 18 ml of distilled water. After dry impregnation of 40 g of support and a step of maturing for 12 hours in a moisture-saturated atmosphere, the solid is dried at 120° C. for 12 hours. A second impregnation step is carried out with a solution prepared by diluting 3.18 g of ammonium heptamolybdate ($Mo_7(NH_4)_6O_{24}·4H_2O$, 99.98%, Merck™), 7.69 g of nickel nitrate ($Ni(NO_3)_2·6H_2O$, 99.5%, Merck™) in 16.4 ml of distilled water. After dry impregnation of 40 g of support and a step of maturing for 12 hours in a moisture-saturated atmosphere, the solid is dried at 120° C. for 12 hours. The solid is subsequently calcined in air at 450° C. for 2 hours. Catalyst C containing 8.9% by weight of NiO and 10.3% by weight of $MoO_3$, and also an Ni/Mo molar ratio=1.68. The catalyst C has a total pore volume of 0.23 ml/g and a specific surface of 4 $m^2/g$.

Example 4: Catalyst D not in Accordance with the Invention (Monomodal Mesoporous Catalyst)

A commercial support S4 (SA 6578, NorPro™) is supplied in the form of 5 mm-diameter extrudate. The support S4 has a specific surface area of 175 $m^2/g$, a total pore volume of 0.82 ml/g, and also the following pore distribution given by mercury porosimetry:

a volume of mesopores with a diameter greater than or equal to 2 nm and less than or equal to 20 nm, the pore distribution of which is centered on 13 nm, of 0.82 ml/g corresponding to 100% of the total pore volume.

The support S4 has a water uptake volume of 0.81 ml/g. The impregnation solution is prepared by diluting 6.06 g of ammonium heptamolybdate ($Mo_7(NH_4)_6O_{24}\cdot 4H_2O$, 99.98%, Merck™) 17.40 g of nickel nitrate ($Ni(NO_3)_2\cdot 6H_2O$, 99.5%, Merck™) in 30.7 ml of distilled water. After dry impregnation of 40 g of support and a step of maturing for 12 hours in a moisture-saturated atmosphere, the solid is dried at 120° C. for 12 hours. The solid is subsequently calcined in air at 450° C. for 2 hours. Catalyst D obtained contains 9.0% by weight of NiO and 10.0% by weight of $MoO_3$, and also an Ni/Mo molar ratio=1.73. The catalyst D has a total pore volume of 0.74 ml/g and a specific surface of 127 $m^2/g$.

Example 5: Catalyst E not in Accordance with the Invention (Catalyst with Macropores and a Monomodal Distribution of Small Mesopores)

A commercial support S5 (SA 6176, NorPro™) is supplied in the form of 1.6 mm-diameter extrudate. The support S5 has a specific surface area of 250 $m^2/g$, a total pore volume of 1.05 ml/g, and also the following pore distribution given by mercury porosimetry:

a volume of mesopores with a diameter greater than or equal to 2 nm and less than or equal to 20 nm, the pore distribution of which is centered on 7 nm, of 0.68 ml/g corresponding to 65% of the total pore volume;

a volume of macropores with a diameter greater than or equal to 50 nm and less than 8000 nm, of 0.37 ml/g corresponding to 35% of the total pore volume.

The support S5 exhibits a water uptake volume of 1.02 ml/g. The impregnation solution is prepared by diluting 6.00 g of ammonium heptamolybdate ($Mo_7(NH_4)_6O_{24}\cdot 4H_2O$, 99.98%, Merck™), 17.40 g of nickel nitrate ($Ni(NO_3)_2\cdot 6H_2O$, 99.5%, Merck™) in 39.1 ml of distilled water. After dry impregnation of 40 g of support and a step of maturing for 12 hours in a moisture-saturated atmosphere, the solid is dried at 120° C. for 12 hours. The solid is subsequently calcined in air at 450° C. for 2 hours. Catalyst E contains 9.0% by weight of NiO and 9.9% by weight of $MoO_3$, and also an Ni/Mo molar ratio=1.75. Catalyst E has a total pore volume of 0.84 ml/g and a specific surface area of 207 $m^2/g$.

Example 6: Use of the Catalysts in Selective Hydrogenation

The activity of catalysts A, B, C, D and E is evaluated by a test of selective hydrogenation of a mixture of model molecules, carried out in a 500 ml stirred autoclave reactor. Typically between 2 and 6 g of catalyst are sulfided at atmospheric pressure in a sulfidation bench under an $H_2S/H_2$ mixture consisting of 15% by volume of $H_2S$ at 1 l/g·h of catalyst and at 400° C. for two hours (ramp of 5° C./min) followed by a hold of 2 hours under pure hydrogen at 200° C. This protocol makes it possible to obtain sulfidation rates greater than 70% for all the catalysts in accordance with the invention. The catalyst thus sulfided is transferred to the reactor in the absence of air and then brought into contact with 250 ml of model feedstock under a total pressure of 1.5 MPa and a temperature of 160° C. The pressure is kept constant during the test by supplying hydrogen. The feedstock used for the activity test has the following composition: 1000 ppm by weight of sulfur of thiophene compounds in the form of 3-methylthiophene, 500 ppm by weight of sulfur of mercaptans in the form of 2-propanethiol, 10% by weight of olefin in the form of 1-hexene, and 1% by weight of diolefin in the form of isoprene, in n-heptane.

The time t=0 of the test corresponds to the bringing into contact of the catalyst and the feedstock. The duration of the test is set at 200 minutes and the gas chromatography analysis of the liquid effluent obtained makes it possible to evaluate the activities of the various catalysts in hydrogenation of isoprene (formation of methylbutenes), hydrogenation of 1-hexene (formation of n-hexane) and increasing of the molecular weight of 2-propanethiol (disappearance of 2-propanethiol).

The activity of the catalyst for each reaction is defined relative to the rate constant obtained for each reaction normalized per gram of catalyst. The rate constants are calculated assuming an order 1 for the reaction. The activities are normalized to 100% for catalyst A.

The selectivity of the catalyst with respect to the hydrogenation of isoprene is equal to the ratio of the activities of the catalyst in the hydrogenation of isoprene and of 1-hexene; A(isoprene)/A(1-hexene). The selectivity is normalized to 100% for catalyst A.

The results obtained on the various catalysts are reported in table 1 below.

TABLE 1

| Catalyst | A | B | C | D | E |
|---|---|---|---|---|---|
| Diolefin hydrogenation activity | 100 | 52 | 21 | 81 | 92 |
| Mercaptan-molecular-weight-increasing activity | 100 | 63 | 13 | 94 | 90 |
| Diolefin hydrogenation selectivity | 100 | 102 | 87 | 90 | 64 |

Selective hydrogenation performance of catalysts A to E

It is found that catalyst A according to the invention has a diolefin hydrogenation activity and a mercaptan-molecular-weight-increasing activity that are systematically greater than those of the other catalysts. Moreover, the selectivities are always among the highest for catalyst A according to the invention.

The invention claimed is:

1. A process for selective hydrogenation of a gasoline comprising polyunsaturated compounds and light sulfur compounds having a boiling point lower than 84° C., said process comprising bringing into contact the gasoline and hydrogen with a catalyst, at a temperature of 80° C. to 220° C., with a liquid space velocity of 1 $h^{-1}$ to 10 $h^{-1}$ and a pressure of 0.5 to 5 MPa, and with a molar ratio between the hydrogen and diolefins to be hydrogenated in the gasoline of greater than 1 and less than 100 mol/mol, said catalyst comprising at least one group VIB metal, at least one group VIII metal, and a mesoporous and macroporous alumina support comprising a bimodal distribution of mesopores and wherein:

the volume of mesopores with a diameter greater than or equal to 2 nm and less than 18 nm is 10% to 30% by volume of the total pore volume of said mesoporous and macroporous alumina support;

the volume of mesopores with a diameter greater than or equal to 18 nm and less than 50 nm is 30% to 50% by volume of the total pore volume of said mesoporous and macroporous support; and the volume of macropores with a diameter greater than or equal to 50 nm and less than 8000 nm is 30% to 50% by volume of the total pore volume of said mesoporous and macroporous support.

2. The process as claimed in claim 1, wherein said mesoporous and macroporous alumina support has a specific surface area of 50 to 210 $m^2/g$.

3. The process as claimed in claim 1, wherein said mesoporous and macroporous alumina support has a total pore volume of 0.7 to 1.3 ml/g.

4. The process as claimed in claim 1, wherein the volume of the mesopores with a diameter greater than or equal to 2 nm and less than 18 nm is 15% to 25% by volume of the total pore volume of said mesoporous and macroporous alumina support.

5. The process as claimed in claim 1, wherein the volume of the mesopores with a diameter greater than or equal to 18 nm and less than 50 nm is 35% to 45% by volume of the total pore volume of said mesoporous and macroporous alumina support.

6. The process as claimed in claim 1, wherein the volume of the macropores with a diameter greater than or equal to 50 nm and less than 8000 nm is 35% to 50% by volume of the total pore volume of said mesoporous and macroporous alumina support.

7. The process as claimed in claim 1, wherein the content of the at least one group VIB metal in said catalyst, expressed in oxide form, is 1% to 30% by weight relative to the total weight of the catalyst.

8. The process as claimed in claim 1, wherein the content of the at least one group VIII metal in said catalyst, expressed in oxide form, is 1% to 20% by weight relative to the total weight of the catalyst.

9. The process as claimed in claim 1, wherein the molar ratio of the at least one group VIII metal to the at least one group VIB metal is 0.3 to 3 mol/mol.

10. The process as claimed in claim 1, wherein the at least one group VIII metal is nickel.

11. The process as claimed in claim 1, wherein the at least one group VIB metal is molybdenum.

12. The process as claimed in claim 1, wherein the pore distribution of the mesopores with a diameter greater than or equal to 2 nm and less than 18 nm is centered on a range of values of 10.5 to 14.5 nm.

13. The process as claimed in claim 1, wherein the pore distribution of the mesopores with a diameter greater than or equal to 18 nm and less than 50 nm is centered on a range of values of 22 to 28 nm.

14. The process as claimed in claim 1, wherein the gasoline is a catalytic cracking gasoline.

15. The process as claimed in claim 1, wherein the mesoporous and macroporous alumina support is in the form of beads with a diameter of 2 to 4 mm.

16. The process as claimed in claim 15, wherein said mesoporous and macroporous alumina support has been obtained according to the following steps:

s1) dehydrating an aluminum hydroxide or an aluminum oxyhydroxide at a temperature of 400° C. to 1200° C. for a time of 0.1 second to 5 seconds to obtain an alumina powder;

s2) shaping said alumina powder obtained in step s1) in the form of beads;

s3) heat treating the alumina beads obtained in step s2) at a temperature above or equal to 200° C.;

s4) hydrothermally treating the alumina beads obtained at the end of step s3) by impregnation with water or an aqueous solution, then residence in an autoclave at a temperature of 100° C. to 300° C.;

s5) calcining the alumina beads obtained at the end of step s4) at a temperature of 500° C. to 820° C.

17. The process as claimed in claim 16, wherein, in step s1), the dehydrating the aluminum hydroxide or the aluminum oxyhydroxide occurs at a temperature of 600° C. to 900° C. for a time of 0.1 second to 4 seconds.

18. The process as claimed in claim 1, wherein said catalyst does not comprise phosphorus.

19. The process as claimed in claim 1, wherein the gasoline after being brought into contact with the catalyst has a surfur content of less than 10 ppm.

20. The process as claimed in claim 1, wherein the gasoline after being brought into contact with the catalyst contains less than 0.5% by weight of diolefins.

* * * * *